United States Patent [19]

Coburn, Jr.

[11] Patent Number: 5,091,232
[45] Date of Patent: * Feb. 25, 1992

[54] LAMINATED DECORATIVE FILM PROVIDING PEARLESCENT APPEARANCE OR EFFECT

[76] Inventor: Joseph W. Coburn, Jr., 953 Princewood Ave., Lakewood, N.J. 08701

[*] Notice: The portion of the term of this patent subsequent to Sep. 6, 2005 has been disclaimed.

[21] Appl. No.: 459,972

[22] Filed: Jan. 2, 1990

[51] Int. Cl.$^5$ .............................................. A61F 13/02
[52] U.S. Cl. ....................................... 428/40; 428/46; 428/461; 428/690
[58] Field of Search .................. 428/457, 690, 46, 40, 428/461

[56] References Cited

U.S. PATENT DOCUMENTS 4,769,265  9/1988  Coburn ................................. 428/40

Primary Examiner—Edith L. Buffalow
Attorney, Agent, or Firm—R. Gale Rhodes, Jr.

[57] ABSTRACT

Laminated decorative film providing a pearlescent appearance or effect including a layer of support material, a layer of substantially clear plastic film, and a layer of substantially transparent film having a predetermined reflection color intermediate the layer of support material and the layer of substantially clear plastic film, the layer of substantially transparent film having a predetermined reflection color having opposite surfaces one of which opposite surfaces is metalized to a predetermined thickness and adhered to the layer of support material and the other of which opposite surfaces is adhered to the layer of substantially clear plastic film.

Process of manufacturing laminated decorative film embodying the present invention and providing a pearlescent appearance or effect, may comprise the steps of adhering one surface of a layer of substantially transparent film having a predetermined reflection color to a layer of substantially clear plastic film, metalizing to a predetermined thickness the opposite surface of the layer of substantially transparent film having a predetermined reflection color, and adhering the metalized surface of the layer of substantially transparent film having a predetermined reflection color to a layer of support material.

13 Claims, 2 Drawing Sheets

LAMINATED DECORATIVE FILM PROVIDING PEARLESCENT APPEARANCE OR EFFECT

BACKGROUND OF THE INVENTION

This invention relates to a new and improved laminated decorative film providing a pearlescent appearance or effect which pearlescent appearance or effect also may be referred to as a pearlacious or pearl-like appearance or effect, and this invention further relates to a new and improved manufacturing process for manufacturing such laminated film.

Innumerable laminated decorative films are known to the prior art which are widely used for innumerable applications including decals, signs, posters, highway signs, traffic markers, artist's layout materials, etc. Various of these laminated decorative films provide a gold effect, iridescent or rainbow effect, different colored effects, different design effects, etc.

An attractive and desirable appearance or effect is the pearlescent effect due to the similarity with the effect produced by natural pearl.

Accordingly, there is a need in the laminated decorative film art for a new and improved laminated decorative film providing a pearlescent appearance or effect and for a new and improved process of manufacturing the same.

SUMMARY OF THE INVENTION

The object of the present invention is to satisfy the foregoing needs in the laminated decorative film art.

Laminated decorative film embodying the present invention and providing a pearlescent appearance or effect may include a layer of support material, a layer of substantially clear plastic film, and a layer of substantially transparent film having a predetermined reflection color intermediate the layer of support material and the layer of substantially clear plastic film, the layer of substantially transparent film having a predetermined reflection color having opposite surfaces one of which opposite surfaces is metalized to a predetermined thickness and adhered to the layer of support material and the other of which opposite surfaces is adhered to the layer of substantially clear plastic film.

Process of manufacturing laminated decorative film embodying the present invention and providing a pearlescent appearance or effect, may comprise the steps of adhering one surface of a layer of substantially transparent film having a predetermined reflection color to a layer of substantially clear plastic film, metalizing to a predetermined thickness the opposite surface of the layer of substantially transparent film having a predetermined reflection color, and adhering the metalized surface of the layer of substantially transparent film having a predetermined reflection color to a layer of support material.

DESCRIPTION OF THE PREFERRED EMBODIMENT

Figure 1:
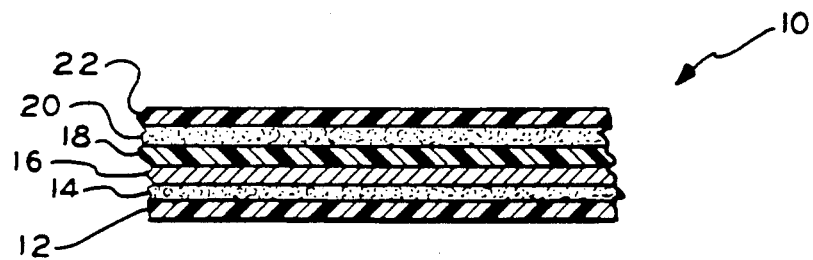
FIG. 1 is a partial, enlarged cross-sectional view of laminated decorative film embodying the present invention and providing a pearlescent appearance or effect.

Referring now to FIG. 1, there is illustrated diagrammatically, in enlarged cross-sectional view, laminated decorative film embodying the present invention, providing a pearlescent appearance or effect and indicated by general numerical designation 10. The laminated decorative film 10 may include a layer of support material 12, a layer of adhesive 14, a layer of metalization 16, a layer of substantially transparent film having a predetermined reflection color 18, a layer of transparent adhesive 20, and a layer of clear plastic film 22. The layer of support material 12 may be a suitable layer of 90 lb. stay flat silicone coated release liner, the layer of adhesive 14 may be a suitable adhesive known to the art for adhering together the layer of support material 12 and the layer of metalization 16, the layer of metalization 16 may be a layer of metalized aluminum metalized to a thickness of about 1000 Angstroms, the layer of substantially transparent film having a reflection color 18 may be a layer of Mearl Iridescent Film IF-5121 or IF-8101 having a predominantly RED/GREEN reflection color when viewed at 90° against a black background and available from the Mearl Corporation, Decorative Film Division, Peekskill, N.Y. 10566, the layer of substantially transparent adhesive 20 may be a layer of substantially transparent adhesive of 100% solids adhesive such as a layer of substantially transparent acrylic hot melt pressure sensitive adhesive, and the layer of transparent or clear plastic film may be a layer of substantially clear acrylic, vinyl, or the like.

Figure 2:
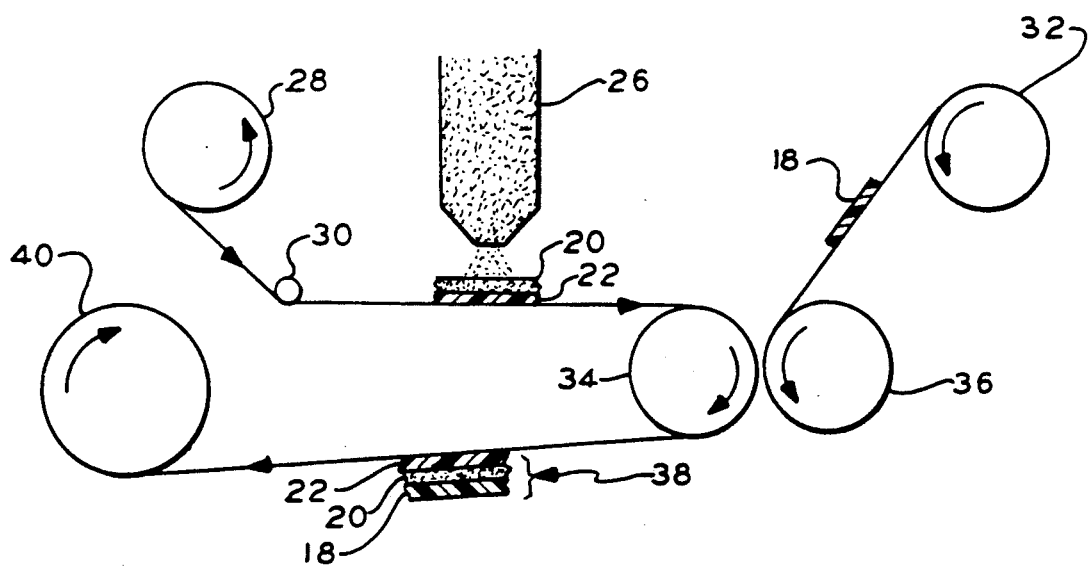
FIG. 2 is a diagrammatical illustration of a manufacturing step of the manufacturing process of the present invention for manufacturing the laminated decorative film of the present invention and illustrates the adhering together with an adhesive of a layer of substantially transparent film having a predetermined reflection color and a layer of substantially clear plastic film.
Figure 3:
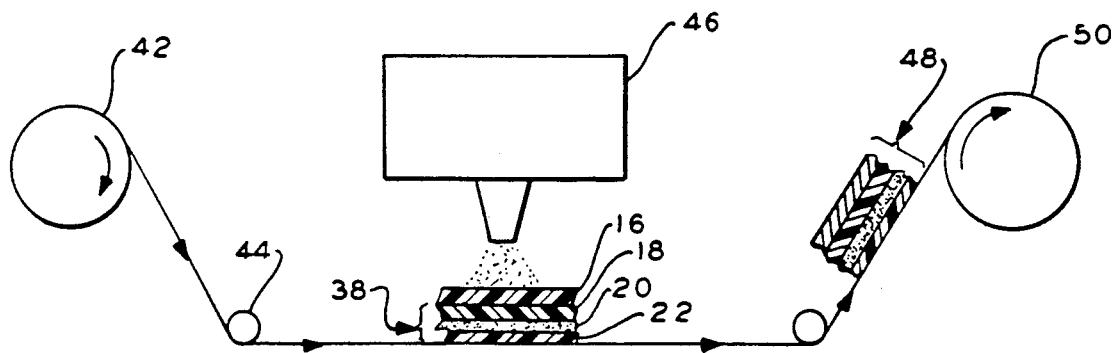
FIG. 3 is a diagrammatical illustration of a manufacturing step of the manufacturing process of the present invention for manufacturing the laminated decorative film of the present invention and illustrates the metalization of the surface of the layer of substantially transparent film having a predetermined reflection color not adhered to the layer of substantially clear plastic film.
Figure 4:
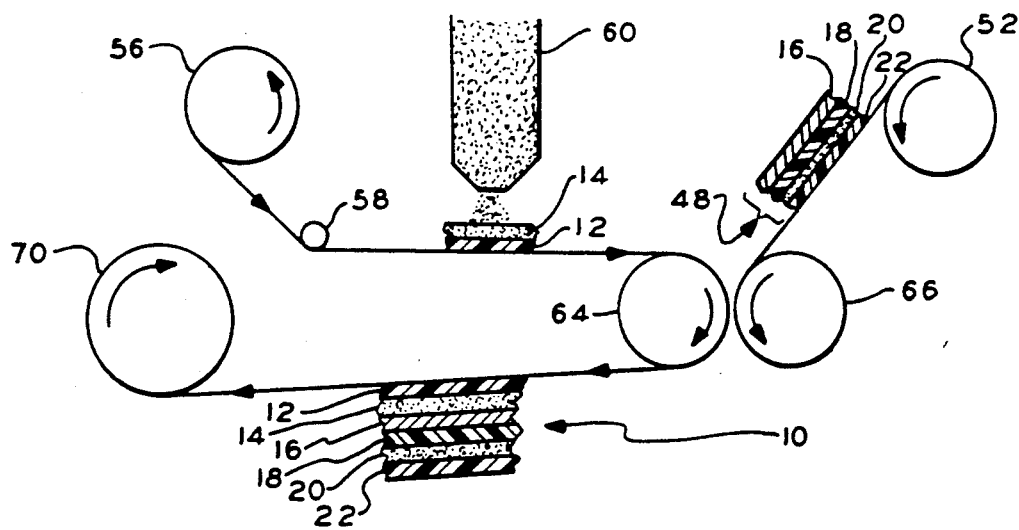
FIG. 4 is a diagrammatical illustration of a manufacturing step of the manufacturing process of the present invention for manufacturing the laminated decorative film of the present invention and illustrates the adhering together with an adhesive of the layer of metalization illustrated in FIG. 3 with a layer of support material.

Referring now to FIGS. 2-4 and the manufacturing process of the present invention for manufacturing the laminated decorative film of the present invention, in particular FIG. 2, the layer of adhesive 20 is dispensed from a suitable hopper 26 and applied to the layer of substantially clear plastic film 22 as the layer of substantially clear plastic film 22 is let off a suitable supply roll 28 thereof, passed under a guide roller 30 and under the adhesive hopper 26. The layer of substantially transparent film having a predetermined reflection color 18 is let off a suitable supply roll 32 thereof and the layers of substantially clear plastic film 22 and substantially transparent film having a predetermined reflection color 18 are adhered together by the adhesive 20 by being passed between a pair of nip rollers 34-36 which supply suitable pressure thereto, e.g. 40 psi, to produce the intermediate lamination indicated by general numerical designation 38 which is taken up on a suitable take-up reel 40 which may be the supply roll 42 of the next step of the manufacturing process of the present invention illustrated diagrammatically in FIG. 3.

Referring now to FIG. 3, the intermediate laminate 38 is let off the supply roll 42 and passed under the guide roller 44 and under suitable metalization apparatus 46 to metalize the layer of substantially transparent film having a predetermined reflection color 18 to provide the layer of metalization 16. This step provides the further intermediate lamination indicated by general designation 48 which is taken up on the take-up roll 50 which may be the supply roll 52 illustrated in FIG. 4.

Referring now to FIG. 4, the layer of support material 12 is let off a supply roll thereof 56, fed under a guide roll 58 and under a suitable adhesive hopper 60 to apply the layer of adhesive 16 to the layer of support material 12. The intermediate laminate 48 is let off the supply roll 52 thereof and the layer of metalization 16, and thereby the intermediate laminate 48, are adhered by the adhesive 16 to the layer of support material 12 by passing between the nip rolls 64-66 which apply suitable pressure thereto, e.g. approximately 40 psi, to form the laminated decorative film 10 of the present invention which is thereafter taken up on the take-up roll 70.

It will be understood that many variations and modifications may be made in the present invention without departing from the spirit and the scope thereof.

What is claimed is:

1. Laminated decorative film providing a pearlescent appearance, comprising:
   a layer of support material;
   a layer of substantially clear plastic film; and
   a layer of substantially transparent film having a predetermined reflection color intermediate said layer of support material and said layer of substantially clear plastic film, said layer of substantially transparent film having a predetermined reflection color having opposite surfaces one of which opposite surfaces is metalized to a predetermined thickness and adhered to said layer of support material and the other of which opposite surfaces is adhered to said layer of substantially clear plastic film.

2. Laminated decorative film according to claim 1 wherein said layer of generally transparent film having a predetermined reflection color is a layer of generally transparent film having a predominantly RED/-GREEN reflection color when viewed at 90° against a black background.

3. Laminated decorative film according to claim 1 wherein said metalized opposite surface of said layer of substantially transparent film having a predetermined reflection color is adhered to said layer of support material by a layer of adhesive.

4. Laminated decorative film according to claim 1 wherein said opposite surface of said layer of substantially transparent film having a predetermined reflection color adhered to said layer of substantially clear plastic film is adhered thereto by a layer of substantially transparent adhesive.

5. Laminated decorative film according to claim 4 wherein said layer of substantially transparent adhesive is a layer of 100% solids adhesive.

6. Laminated decorative film according to claim 5 wherein said 100% solids adhesive is substantially transparent acrylic hot melt pressure sensitive adhesive.

7. Laminated decorative film according to claim 1 wherein said opposite surface of said layer of substantially transparent film having a predetermined reflection color adhered to said layer of substantially clear plastic film is adhered thereto by bonding or fusing.

8. Process of manufacturing laminated decorative film providing a pearlescent appearance, comprising the steps of:
   adhering one surface of a layer of substantially transparent film having a predetermined reflection color to a layer of substantially clear plastic film;
   metalizing to a predetermined thickness the opposite surface of said layer of substantially transparent film having a predetermined reflection color; and
   adhering said metalized surface of said layer of substantially transparent film having a predetermined reflection color to a layer of support material.

9. Process according to claim 8 wherein said opposite surface of said layer of substantially transparent film having a predetermined reflection color is metalized to a thickness of about 1,000 angstroms.

10. Process according to claim 8 wherein said step of adhering said metalized surface of said layer of substantially transparent film having a predetermined reflection color to said layer of support material is the step of adhering with a layer of adhesive.

11. Process according to claim 8 wherein said step of adhering said one surface of said layer of substantially transparent film having a predetermined reflection color to said layer of substantially clear plastic film is the step of adhering with a layer of substantially transparent adhesive.

12. Process according to claim 8 wherein said step of adhering said one surface of said layer of substantially transparent film having a predetermined reflection color to said layer of substantially clear plastic film is the step of adhering by fusing or bonding.

13. Product manufactured according to the process of claim 8.

* * * * *